United States Patent [19]

Koumura et al.

[11] Patent Number: 4,936,677
[45] Date of Patent: Jun. 26, 1990

[54] PROJECTION APPARATUS

[75] Inventors: Noboru Koumura, Narashino; Yoshihiko Hirose, Yokohama; Shigeru Sugita, Sayama, all of Japan

[73] Assignee: Canon Kabushiki Kaisha, Tokyo, Japan

[21] Appl. No.: 217,133

[22] Filed: Jul. 5, 1988

Related U.S. Application Data

[63] Continuation of Ser. No. 906,833, Sep. 10, 1986, abandoned.

[30] Foreign Application Priority Data

Sep. 18, 1985 [JP] Japan ................ 60-206053
Oct. 14, 1985 [JP] Japan ................ 60-228366
Oct. 21, 1985 [JP] Japan ................ 60-235926
Nov. 27, 1985 [JP] Japan ................ 60-266788

[51] Int. Cl.⁵ ............................. G03B 21/00
[52] U.S. Cl. ......................... 353/25; 353/26 A
[58] Field of Search ............. 353/25, 26 R, 26 A, 353/27 R, 27 A, 119

[56] References Cited

U.S. PATENT DOCUMENTS 3,164,059 1/1965 Turrentine .
3,179,001 4/1965 Silverman ............... 353/26 A
3,614,022 10/1971 Henriksen .
3,646,258 2/1972 Lemelson ............... 352/123 X
4,025,176 5/1977 Lopata ................... 353/26 A
4,160,169 7/1979 Endicott ................. 353/26 P
4,353,642 10/1982 Weigert .................. 353/25
4,373,918 2/1983 Berman ................... 353/72 X Primary Examiner—Harry N. Haroian

[57] ABSTRACT

A projection apparatus for selecting one of a plurality of cartridges each of which stores an information recording medium and for projecting information of the information recording medium stored in a selected one of the cartridges includes a first cartridge reception member for holding the cartridge in a first position, a second cartridge reception member for holding the cartridge in a second position, an optical system for projecting information of the information recording medium onto a predetermined position, a detector for detecting the presence/absence of the cartridge in the first and second cartridge reception members, and a retrieval control circuit for controlling the first and second cartridge reception members to cause the optical system to project the information of the information recording medium of the cartridge first detected by the detector.

31 Claims, 15 Drawing Sheets

PROJECTION APPARATUS

This application is a continuation-in-part continuation of application Ser. No. 906,833 filed 9/10/86 now abandoned.

BACKGROUND OF THE INVENTION

1. Field of the Invention

The present invention relates to a projection apparatus using a cartridge for storing an information recording medium such as a microfiche and a microfilm roll.

2. Related Background Art

A conventional projection apparatus of this type comprises a storage portion for storing a plurality of film cartridges with microfiches or microfilm rolls, and a film retrieval portion for automatically feeding out the film from the cartridge and retrieving a desired image at a predetermined projection position. The retrieved film image is projected on a screen, a photosensitive body, or an image sensor.

In such a projection apparatus, the target cartridge is selected from the storage portion and fed to the predetermined projection position. The film is fed out from the selected cartridge placed at a predetermined position. A desired frame in the film is observed or printed at the projection position, and then the film is returned to the cartridge. The cartridge is then stored where it was in the storage portion, thus completing the use of the first cartridge. Subsequently, the second cartridge is fed to the predetermined position to allow use of the film in the second cartridge. In this case, if a failure occurs in a cartridge carrier mechanism, the projection apparatus cannot be used until the mechanism is repaired, resulting in inconvenience.

Furthermore, if a user is not aware that the cartridge carrier mechanism has failed and forcibly operates it to select and feed a desired cartridge, the projection apparatus and the cartridge are damaged. It also takes a long period of time to use the film of the next cartridge after the film of the first cartridge is used. Even if the user wishes to use another cartridge while using the first cartridge, any cartridge cannot be used until the first cartridge is returned to the original location, resulting in inconvenience.

Various types of cartridges for storing microfilms have been used in practice. However, cartridges used in film projection apparatuses are limited to a specific type In this sense, different types of cartridges cannot be used in the projection apparatus of this type. Specific film projection apparatuses must be prepared if different types of cartridges are used to result in an economical disadvantage. In addition, the user must use different types of cartridges.

SUMMARY OF THE INVENTION

It is an object of the present invention to eliminate the conventional drawbacks described above and to provide an efficient projection apparatus.

It is another object of the present invention to provide a projection apparatus which can be used even if a cartridge carrier mechanism thereof fails.

It is still another object of the present invention to provide a projection apparatus wherein more than one cartridge can be used at high speed and another cartridge can be used even while one cartridge is being used.

It is still another object of the present invention to provide a projection apparatus wherein different types of cartridges can be used. BRIEF DESCRIPTION OF THE DRAWINGS.

Figure 16A:
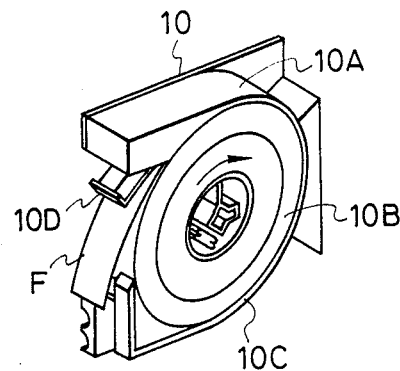
Figure 16B:
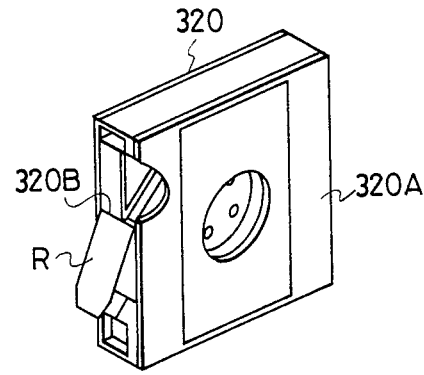
Figure 17:
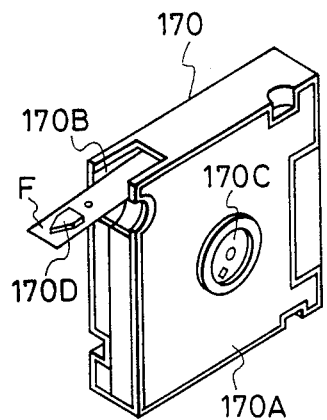
Figure 18:
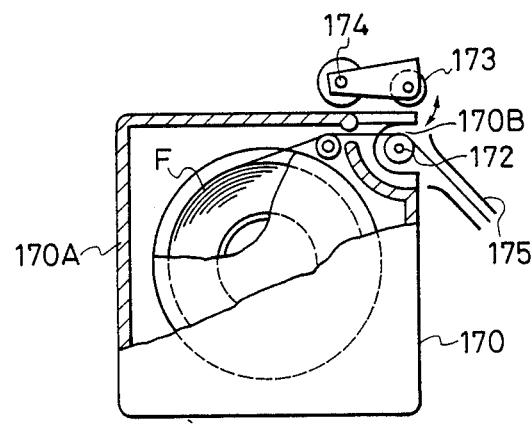

FIGS. 16(A) and 16(B) are perspective views showing different cartridges;

FIG. 17 is a perspective view showing a cartridge different from those in FIGS. 16(A) and 16(B); and FIG. 18 is a side view of a film pickup mechanism.

DETAILED DESCRIPTION OF THE PREFERRED EMBODIMENTS

The present invention will be described in detail with reference to the preferred embodiments in conjunction with the accompanying drawings.

Figure 1:
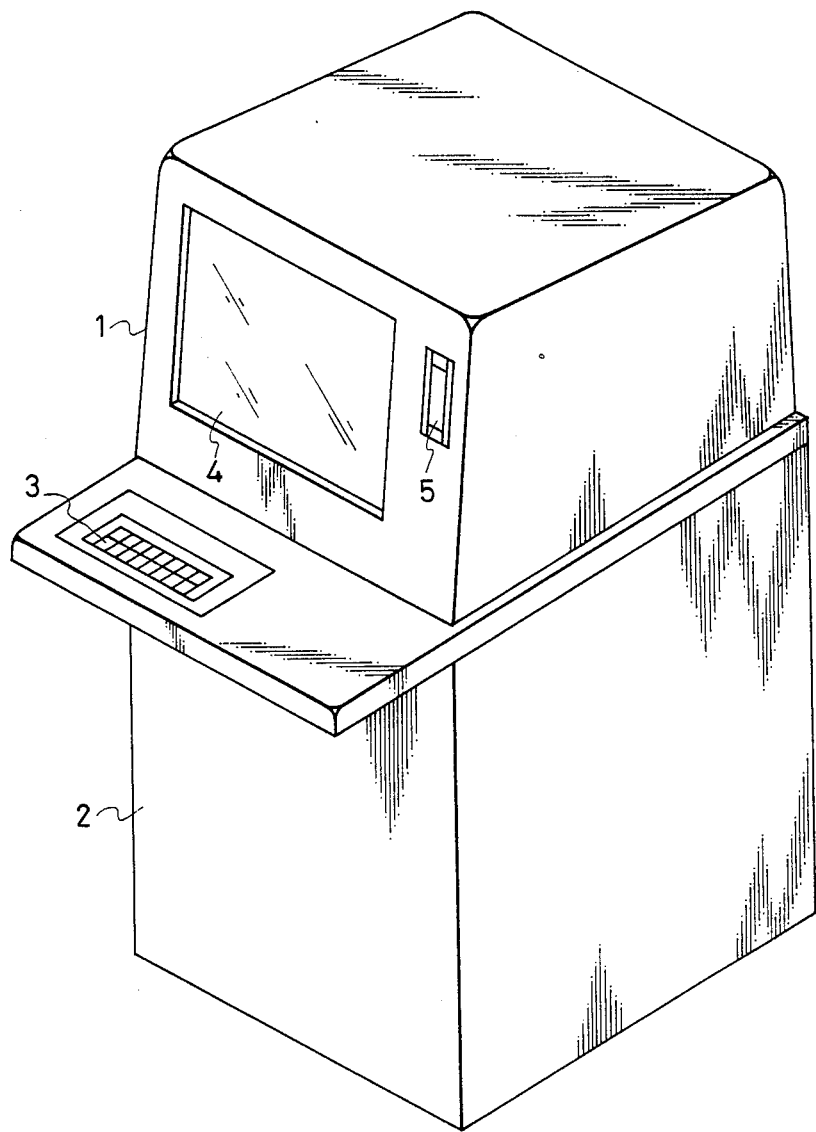
FIG. 1 is a perspective view showing an outer appearance of a film reader/printer with a projection apparatus according to an embodiment of the present invention.

FIG. 1 shows a film reader/printer with a projection apparatus according to an embodiment of the present invention. The reader/printer system comprises a first housing 1 as an upper housing, a second housing 2 as a lower housing, and an operation panel 3 for generating various commands. The upper housing 1 has a screen 4 and an outside cartridge insertion port 5 at its front surface.

Figure 2:
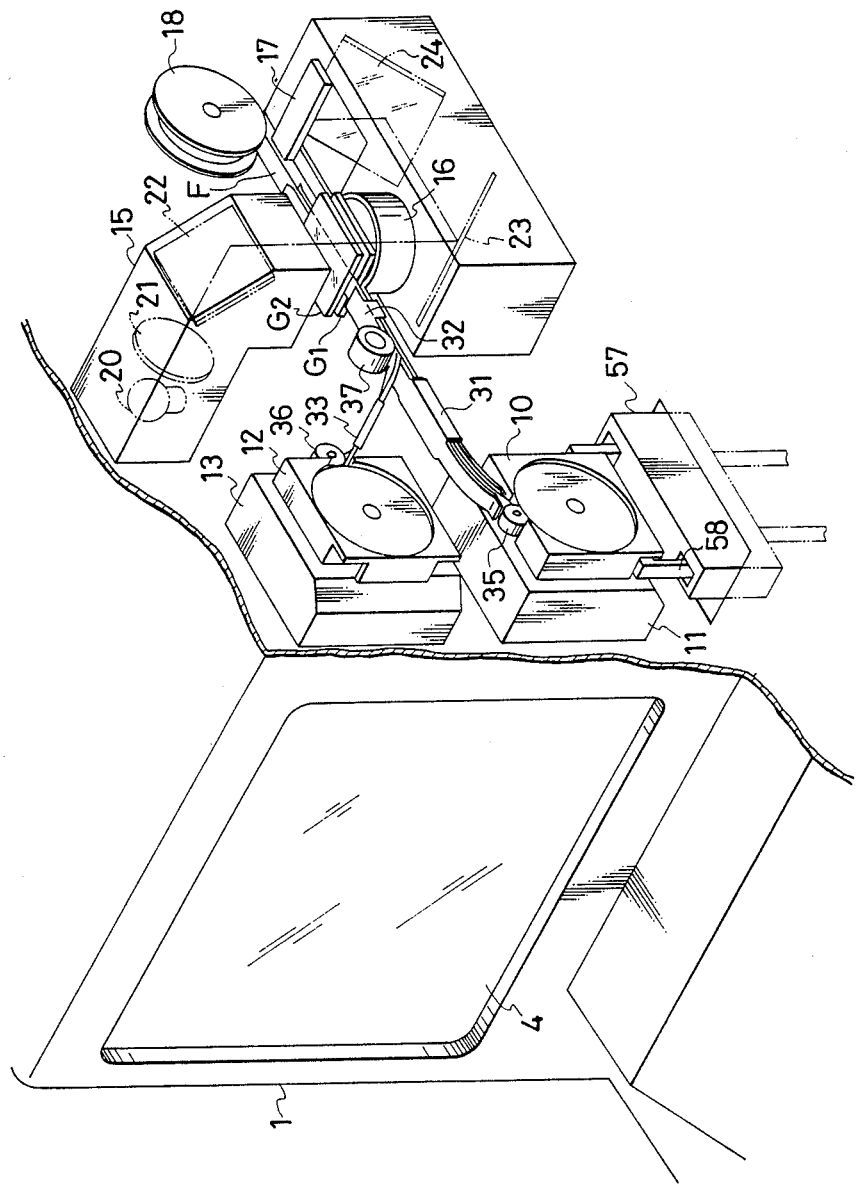
FIG. 2 is a perspective view showing an interior of an upper housing of the film reader/printer.

As shown in FIG. 2, the upper housing 1 accommodates a first cartridge reception member 11, a second cartridge reception member 13, an illumination portion 15, a focusing lens 16, an image sensor 17, and a take-up reel 18. The first cartridge reception member 11 holds an inside cartridge 10 at a first position. The cartridge 10 is automatically selected from a cartridge storage portion in the lower housing 1. The second cartridge reception member 13 holds an outside cartridge 12 at a second position. The second cartridge 12 is manually inserted from the outside cartridge insertion port 5. The illumination portion 15 illuminates a microfilm pulled from the cartridge 10 or 12. The second cartridge reception member 13 is located above the first cartridge reception member 11. The first and second housings 1 and 2 can be separated. The first housing 1 can be singly used. The films in the cartridges 10 and 12 are wound around spools in the form of coils, respectively.

The illumination portion 15 comprises a lamp 20, a condenser lens 21, and a mirror 22. Light from the lamp 20 is projected through the condenser lens 21 and the mirror 22 onto a microfilm F located between a pair of glass plates G1 and G2. Light transmitted through the microfilm passes through the focusing lens 16, reflected by mirrors 23 and 24, and projected onto the image sensor 17. The image sensor 17 comprises an array of light-receiving elements such as CCDs and photodiodes. The image sensor 17 converts an image of the microfilm into an electrical signal. An image signal from the image sensor is processed by a signal processor, and the processed signal is sent to a known printer such as a laser beam printer. A copy image is thus produced at the printer. If the above system is used as a reader, light passing through the focusing lens 16 is projected onto the screen 4 through an optical system (not shown) so that the user can observe the image of the microfilm on the screen. A known photosensitive body may be located in place of the image sensor 17 to perform normal copying.

Figure 3:
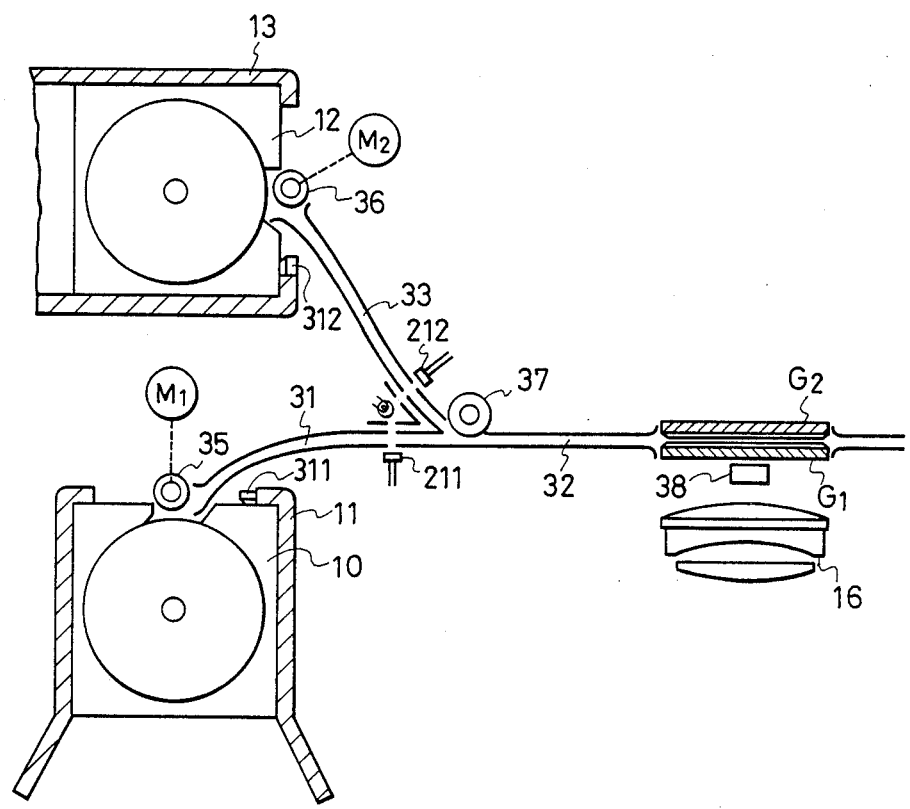
FIG. 3 is a side view showing film feed paths.

FIG. 3 shows microfilm feed paths. A microfilm in the inside cartridge 10 is fed along a first path 31 and a second path 32, passes between the glass plates G1 and G2, and is guided to the take-up reel 18. A microfilm in the outside cartridge 12 passes along a third path 33 and the second path 32, is fed between the glass plates G1 and G2, and is guided to the take-up reel 18. The first and third paths 31 and 33 merge into the second path 32. The microfilms of the cartridges 10 and 12 are fed to the common second path 32. Film guide plates are arranged along the paths 30 to 33. Each film is guided by the film guide plates along a predetermined path. The microfilm feed mechanism also include film pickup rollers 35 and 36, a film guide roller 37, and a mark detector 38.

The film pickup roller 35 is coupled to a motor M1 and can be moved by a first solenoid (not shown) between a position where the roller 35 is in rolling contact with the microfilm in the cartridge 10 located in the first position and a position where the roller 35 is separated from the microfilm. The film pickup roller 36 is coupled to a motor M2 and can be moved by a second solenoid (not shown) between a position where the roller 36 is in rolling contact with the microfilm in the cartridge 12 located in the second position and a position where the roller 36 is separated from the microfilm.

If the inside cartridge 10 is used, the roller 35 is rotated in response to a retrieval instruction and is moved to the position where the roller 35 is in rolling contact with the microfilm F in the cartridge 10. The leading end of the microfilm is picked up outside the cartridge 10. The film F passes through the first and second paths 31 and 32 and is fed to the take-up reel 18. The take-up reel 18 is driven by a motor in the retrieval mode and automatically takes up the leading end of the film. When the leading end of the microfilm is wound around the take-up reel 18, the roller 35 is stopped. At the same time, the roller 35 is shifted to the position where it is separated from the microfilm. Thereafter, the film is pulled upon rotation of the take-up reel 18. However, when the microfilm is to be rewound, the film spool of the cartridge 10 is rewound by a rewinding motor (not shown) in the rewinding direction.

However, if the outside cartridge 12 is used, the roller 36 is rotated and brought into rolling contact with the microfilm in the cartridge 12. The leading end of the microfilm is picked up by the roller 36. The film passes along the third and second paths 33 and 32 and is guided to and wound by the take-up reel 18 in the same manner as described above. When the leading end of the microfilm is wound around the take-up reel 18, the roller 36 is stopped and at the same time is separated from the film. Thereafter, the film is pulled from the outside cartridge upon rotation of the take-up reel. In order to rewind the film into the outside cartridge 12, the film spool in the cartridge 12 is driven in the rewinding direction.

The mark detector 38 detects counting marks attached to the sides of the respective frames of the microfilm. The mark detector 38 comprises a photoelectric transducer element. The film is clamped in the mark detector 38 and is driven in a direction opposite the illumination portion 15. The microfilm marks have a density different from that of the surrounding portion of the frame. When the microfilm is fed and light incident on the mark detector 38 is interrupted by the mark, the mark detector 38 outputs a mark detection signal. The mark detection signal output upon detection of the mark by the mark detector 38 is counted by a counter. A count from the counter is compared with an address number of a desired frame. If a coincidence is established, the film is stopped to retrieve the desired frame. The retrieved frame is located in the projection path. The detailed arrangement of the retrieval apparatus is described in detail in Japanese Patent Publication No. 15691/1980, and a detailed description thereof will be omitted.

Figure 4:
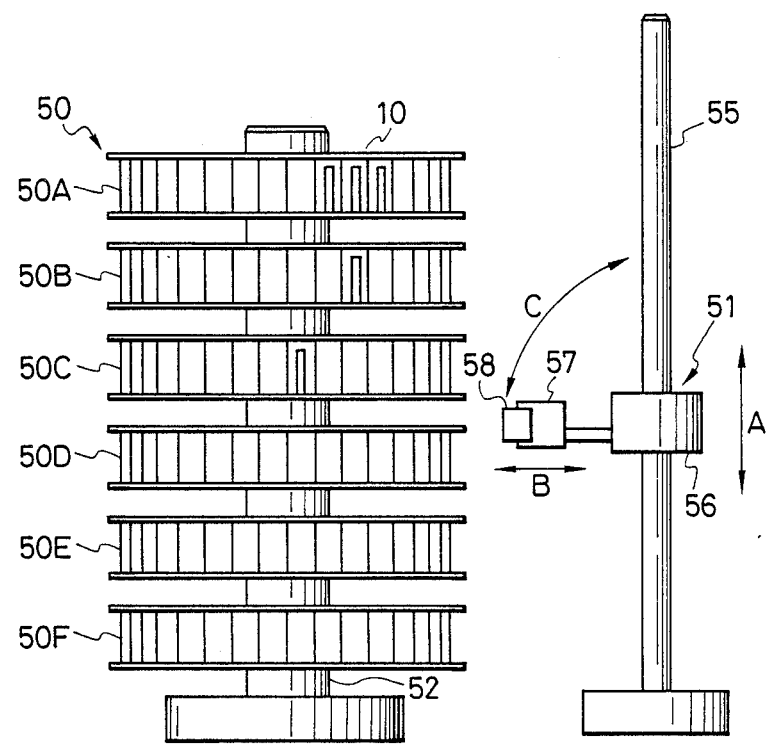
FIG. 4 is a side view showing the interior of a lower housing of the film reader/printer.

The lower housing 2 accommodates a cartridge storage portion 50 for storing a large number of cartridges 10, and a cartridge holder mechanism (to be referred to as a CHL hereinafter) 51 for selecting one of the cartridges from the storage portion 50 and feeding the selected cartridge to the first position, as shown in FIG. 4.

Drums 50A to 50F are stacked at predetermined angular intervals to radially align the inside cartridges 10 in the cartridge storage portion 50. The drums 50A to 50F are rotated around a central shaft 52. The drums have an identical construction, and partition chambers for separately storing the cartridges are radially formed.

The CHL 51 comprises a lifting member 56 which is vertically movable along a pole 55 vertically extending near the cartridge storage portion 50 in directions indicated by a double-headed arrow A, a movable member 57 for movement back and forth horizontally (arrow B) on the lifting member 56, and a hand 58 arranged at the distal end of the movable member 57 to hold the cartridge. The lifting member 56 can be vertically moved from the top to the bottom of the pole 55. The movable member 57 is reciprocally movable between a forward end position where the hand 58 can hold the cartridge from the storage portion 50 and a backward position where the hand 58 can hold the cartridge outside the cartridge storage portion 50. At the same time, the movable member 57 is pivotal from the horizontal state to the vertical state in the directions indicated by a double-headed arrow C. The hand 58 has a gripper structure for holding or releasing the cartridge stored in the storage portion 50.

With the above arrangement, the movable member 57 is located in the horizontal position and the backward end position in the initial state in FIG. 4, and the lifting member 56 is located at the home position of the bottom or intermediate level of the pole 55.

If an operator enters a desired cartridge number and a desired frame number in the desired cartridge to designate retrieval, the lifting member 56 is vertically moved to the drum position for storing the designated cartridge. At the same time, this drum is rotated. When the partition chamber for storing the desired cartridge reaches a position where the hand 58 can hold the desired cartridge, the rotation of the drum is stopped so that the hand 58 opposes the desired cartridge. The movable member 57 is moved to the forward end position. When the hand 58 is brought into contact with the cartridge 10, the hand 58 is operated to hold the desired cartridge 10. The cartridges are withdrawn after the desired cartridge is held. When the movable member 57 reaches the backward end position, the lifting member 56 is moved upward. At the same time, the movable member 57 is rotated to extend vertically. Upon upward movement of the lifting member 56, the cartridge 10 is fed to the first cartridge reception member 11. Therefore, the desired cartridge 10 is located in the first position. The cartridge 10 is held to the first position by the movable member 57 and the lifting member 56.

The pickup roller 35 is rotated and is brought into contact with the film in the cartridge 10 located in the first position. The microfilm is then pulled outside the cartridge 10, and the desired frame in the microfilm is retrieved. After the microfilm of the desired cartridge 10 is observed at the reader or printer, the operator designates a rewinding instruction. The microfilm is rewound into the cartridge 10. Upon completion of rewinding, the lifting member 56 which holds the cartridge 10 is moved downward. The movable member 57 is rotated to obtain the horizontal state. When the lifting member 56 is moved downward to the drum position where the desired cartridge is returned to the corresponding drum, and when the movable member 57 is returned to the horizontal position, as shown in FIG. 4, the movable member 57 is moved forward to return the used cartridge to the corresponding partition chamber. After returning, when a retrieval instruction for another cartridge is output, the above operation is repeated.

However, if an outside cartridge is used, it is inserted from the outside cartridge insertion port 5 to cause the outside cartridge reception member 13 to hold it. The outside cartridge 12 is located at the second position. When the operator inputs a desired frame number and a retrieval start instruction at the input device of the operation panel 3, the pickup roller 36 starts rotation. The roller 36 is brought into rolling contact with the film located inside the outside cartridge 12. Therefore, the desired frame in the microfilm of the outside cartridge can be retrieved.

In the above embodiment, there is one holding position for the outside cartridge. However, the outside cartridges may be held at a plurality of positions, and the cartridges may be selectively fed to a common path.

Figure 5:
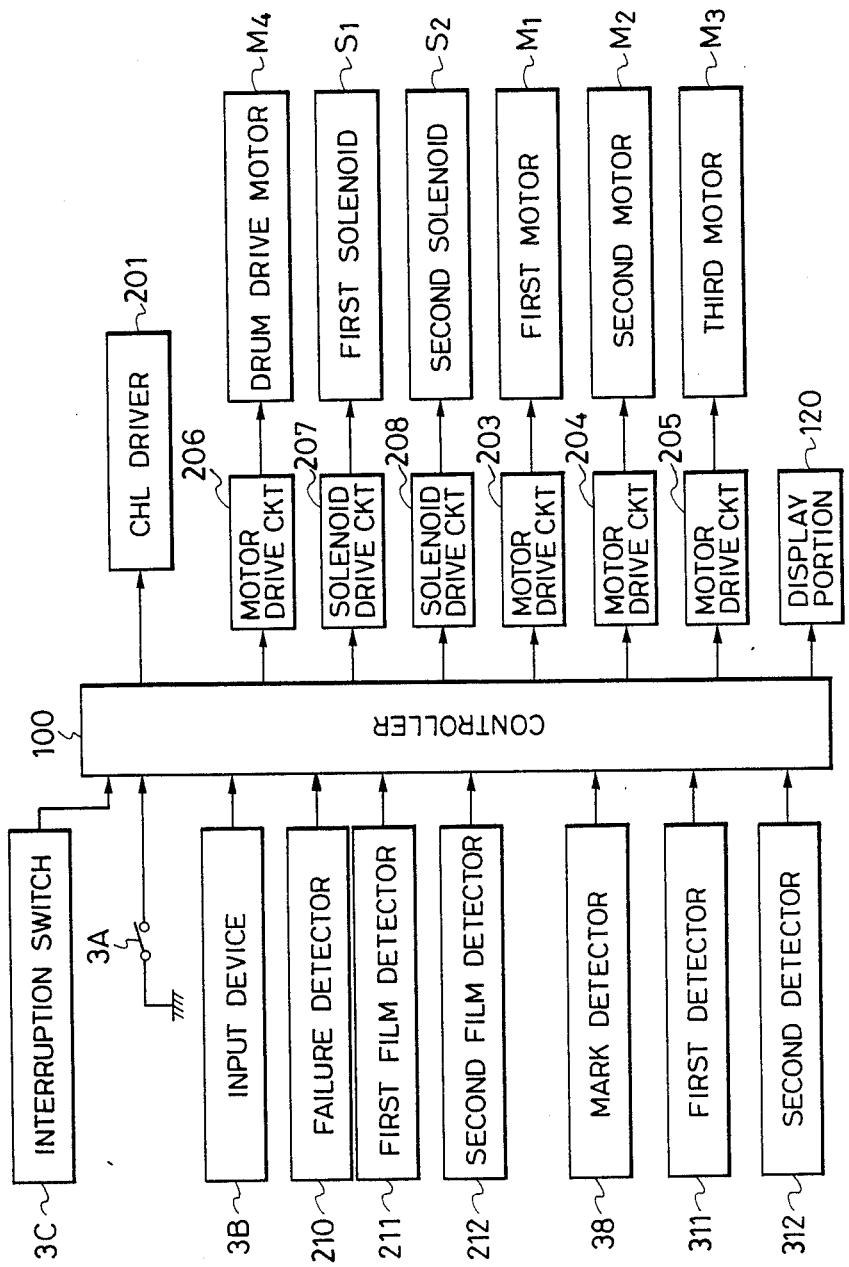
FIG. 5 is a block diagram of a retrieval control circuit in the film reader/printer.
Figure 6:
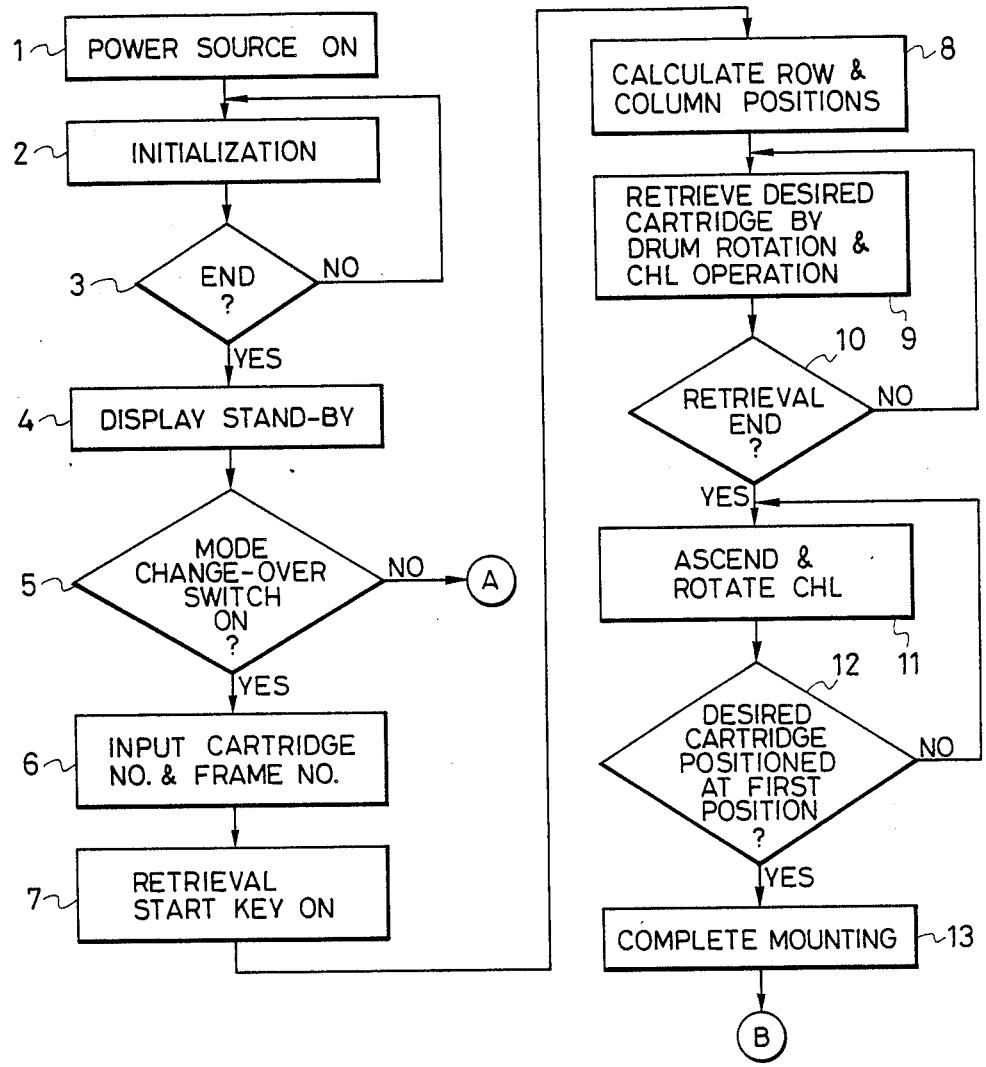
FIGS. 6 to 9 are flow charts for explaining retrieval of the film reader/printer.
Figure 7:
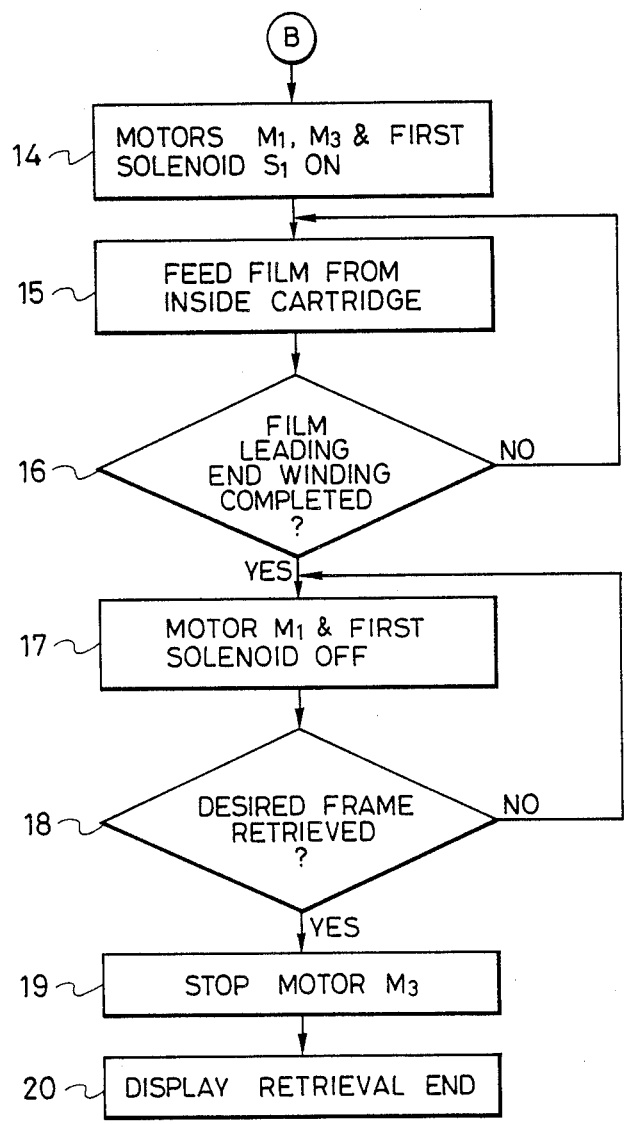
Figure 8:
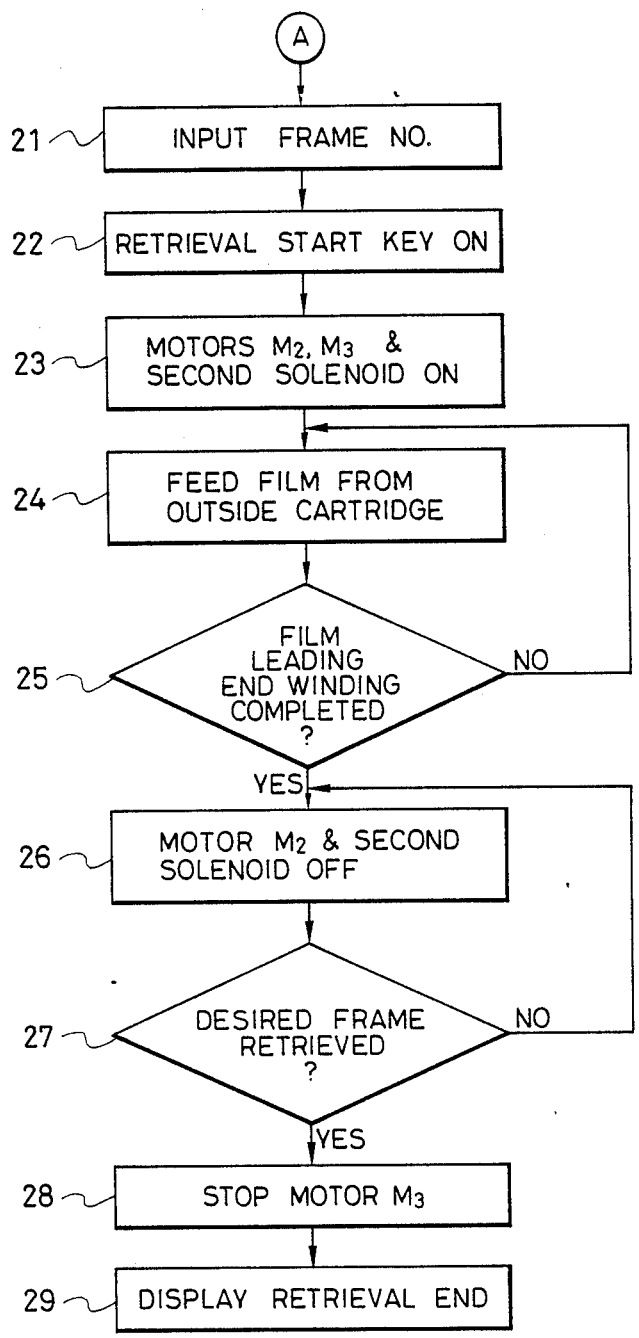

FIG. 5 is a block diagram of a retrieval control circuit in the system described above. The retrieval control circuit includes a mode change-over switch 3A and an input device 3B. The mode change-over switch 3A is arranged on the operation panel 3 and can be automatically or manually turned on/off. When the switch 3A is turned on, the first mode for using the inside cartridge stored in the storage portion is set. The OFF operation, however, signifies the second mode for using the outside cartridge.

The input device 3B is also arranged on the operation panel 3 and includes a power switch, a ten-key pad, a retrieval start key, a print key, and a rewind key.

A controller 100 comprises a microcomputer which includes a central processing unit (CPU), a ROM as a program memory, and a RAM as a data memory. The respectively driving units are operated in a predetermined order according to the program stored in the ROM. Various arithmetic operations are also performed according to the program and data stored in the RAM. The controller 100 detects the presence/absence of the mark according to an output signal from the mark detector 38. A mark detection signal from the mark detector 38 is counted by a counter.

The controller 100 is connected to a CHL driver 201 for driving the CHL 51. The controller 100 is also connected to motor drive circuits 203 to 206 and solenoid drive circuits 207 and 208. The motor drive circuits 203 to 206 respectively drive the first motor M1 for driving the pickup roller 35, the second motor M2 for driving the pickup roller 36, a third motor M3 for driving the take-up reel 18, and a drum drive motor M4 for rotating the drums 50A to 50F in the storage portion 50. The solenoid drive circuits 207 and 208 respectively drive a first solenoid S1 for driving the pickup roller 35 between the position where the roller 35 is in rolling contact with the film and the position where the roller 35 is separated therefrom, and a second solenoid S2 for driving the pickup roller 36 between the position where the roller 36 is in rolling contact with the film and the position where the roller 36 is separated therefrom.

If the first and second solenoids S1 and S2 are turned on, the pickup rollers 35 and 36 connected thereto are moved to positions where they are in rolling contact with the corresponding films. However, the OFF operations of the first and second solenoids S1 and S2 respectively signify movement of the pickup rollers 35 and 36 to positions where the rollers 35 and 36 are separated from the corresponding films.

A failure detector 210 is connected to an input of the controller 100 to detect the disabled state of the inside cartridge caused by a failure of the CHL 51, the storage portion 50, the motor M1 or the first solenoid S1. If a mechanism for rotating the drums 50A to 50F, a mechanism for driving the lifting member 56, the movable member 57, and the band 58, and a mechanism for rotating and shifting the pickup roller 35 are not properly operated, malfunction, or overrun, the failure detector 210 outputs a failure signal. For example, if the hand 58 cannot properly hold the cartridge, if the cartridge cannot be released, if the drums 50A to 50F are not stopped at the predetermined position, if the pickup roller 35 is not moved to the position where the roller 35 is in rolling contact with the film because of the failure of the first solenoid S1, if the CHL 51 is not driven because of the failure of the motor or the like, or if a cartridge or film jam in the path occurs, the failure signal is generated.

A first detector 311 detects whether a cartridge is present in the first cartridge reception member 11. A second detector 312 detects whether a cartridge is present in the second cartridge reception member 13. The first and second detectors 311 and 312 comprise microswitches, respectively. However, the microswitches may be replaced with known photointerruptors. The controller 100 is also connected to a display portion 120.

A first film detector 211 detects whether a film is present in the first path 31. A second film detector 212 detects whether a film is present in the second path 33. The film detectors 211 and 212 comprise photointerruptors each consisting of a lamp and a light-receiving element. However, the photointerruptors may be replaced with microswitches.

FIGS. 6 to 9 are flow charts for explaining the operation of the system described above. In step 1, the power switch is turned on. In step 2, the drums 50A to 50F are rotated and located at the predetermined angular positions as home positions, and the CHL 51 is driven to be set in a predetermined home position (initialization). The system is thus set in a stand-by state (step 4).

The flow then advances to step 5. If a cartridge in the storage portion 50 is used, the mode change-over switch 3A is turned on to select the first mode. In step 6, a desired cartridge number and a desired frame number are input at the ten-key pad of the input device 3B. In step 7, the retrieval start key is turned on.

In step 8, the controller 100 calculates the row and column positions of the desired cartridge according to the input cartridge number data. The drums 50A and 50B are rotated according to a calculation result. At the same time, the CHL 51 is driven to retrieve the desired cartridge (step 9). If the desired cartridge is retrieved (step 10) and is held by the hand 58, the lifting member 56 is moved upward and at the same time the movable member 57 is pivoted (step 11). If the desired cartridge 10 reaches the first position (step 12), the retrieved cartridge 10 is mounted on the first cartridge reception member 11, thus completing mounting of the cartridge (step 13). The flow advances to step 14 in FIG. 7, and the motors M1 and M3 and the first solenoid S1 are turned on to bring the pickup roller 35 into rolling contact with the film of the cartridge 10, thereby picking up the film (step 15).

If the leading end of the film is wound around the take-up reel 18 (step 16), the motor M1 and the first solenoid S1 are turned off (step 17). The motor M3 continues to rotate to supply the film to the take-up reel 18. If the target frame is retrieved in step 18, the motor M3 is stopped in step 19 to stop running the film, thus completing the retrieval (step 20). The retrieved frame is projected on the screen, and the frame image is thus observed on the screen. After the user observes the desired frame, he turns on the rewind key on the input device 3B. A motor (not shown) coupled to the film spool in the inside cartridge 10 is driven to rewind the film into the cartridge 10. Upon completion of rewinding, the CHL 51 is operated in the manner opposite to that described above. The used cartridge is returned to the corresponding drum.

If an outside cartridge is used, the mode change-over switch 3A is turned off in step 5 to select the second mode. In this case, the flow advances to step 21 in FIG. 8. After the external cartridge 12 is mounted on the second cartridge receiving member 13, a desired frame number is input with the ten-key pad on the input device 3B in step 21. The retrieval start key is turned on in step 22. The motor M2 and M3, and the second solenoid S2 are turned on in step 23. The pickup roller 36 is brought into rolling contact with the cartridge 12, and the film is picked up (step 24). If the leading end of the film is wound around the take-up reel 18 (step 25), the motor M2 and the second solenoid S2 are turned off (step 26). In this case, the motor M3 continues to rotate to supply the film to the take-up reel 18. If the target frame is retrieved in step 27, the motor M3 and therefore the film are stopped in step 28. Therefore, the retrieval operation is ended (step 29). The desired or target frame is projected onto the screen, and the image of this frame can be observed thereon. After this frame is used, the user turns on the rewind key on the input device 3B to drive a motor (not shown) coupled to the film spool in the outside cartridge 12. As a result, the film is rewound into the cartridge 12.

Figure 9:
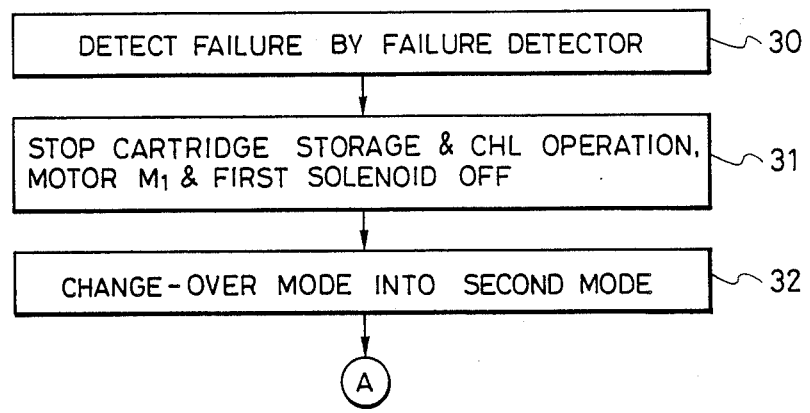

An operation will be described wherein the failure detector 210 detects a failure while the mode change-over switch 3A is turned on to set the first mode using the inside cartridge and the inside cartridge is being retrieved. In this case, the operation in the flow chart in FIG. 9 is executed. If the failure detector 210 detects a failure and outputs a failure signal while the inside cartridge is being retrieved in the first mode (step 30), the storage portion and the CHL are stopped. At the same time, the motor M1 and the first solenoid S1 are turned off, thereby interrupting the selection and feeding of the inside cartridge (step 31). The flow advances to step 32. The mode change-over switch 3A is automatically turned off to set the second mode. The flow advances to step 14 in FIG. 7. The operations in step 14 and the subsequent steps have been described above and will be omitted. It should be noted that the mode changeover switch 3A is not only operated manually but also operated automatically. If the failure detector detects a failure, the mode change-over switch need not be turned on. In this case, the second mode may be set within the circuit.

If a failure occurs during retrieval of the inside cartridge, the system is automatically changed over to the mode for using the outside cartridge. Therefore, the system can be efficiently operated using the outside cartridge.

In the above embodiment, the cartridges store film rolls, respectively. However, a cartridge may store a plurality of microfiches.

A mechanism for selecting the cartridges stored in the storage portion is not limited to the one exemplified by the above embodiment. A known cartridge selection mechanism may be used instead.

According to the present invention as described above, even if the failure occurs in the system while the inside cartridge is being used, another cartridge can be used to operate the system, thereby using the system with high efficiency. Furthermore, when a failure occurs, the system is automatically changed over to the mode using another cartridge, use of the cartridge is not interrupted, and there is no fear of damaging the inside cartridge. The operation can be performed with ease, thus providing many practical effects.

Figure 10:
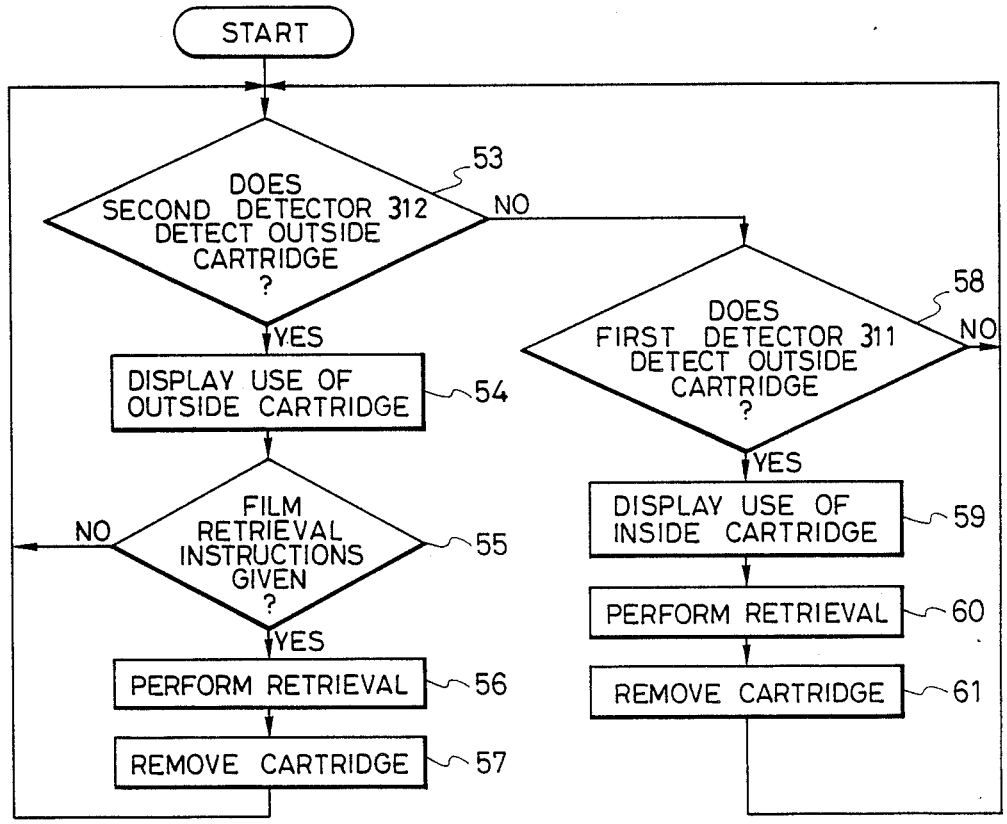
FIG. 10 is a flow chart for explaining retrieval operation according to another object of the present invention.

FIG. 10 is a flow chart showing retrieval operation according to another embodiment of the present invention. The inside cartridge and the outside cartridge can be selectively used regardless of the change-over state of the mode change-over switch 3A.

Whether the second detector 312 detects the outside cartridge is determined in step 53. If YES in step 53, the flow advances to step 54. Outside cartridge in- use display is performed at the display portion 120. The controller 100 determines in step 55 whether a film retrieval instruction is generated. If YES in step 55, the flow advances to step 56 to retrieve a desired frame in the film in the outside cartridge. When the desired frame is retrieved and is observed on the screen or the like, the film is returned into the outside cartridge. In step 57, if the outside cartridge is manually exhausted from the second cartridge reception member 13, the flow advances to step 53. However, if the controller 100 determines in step 53 that the second detector 312 does not detect the outside cartridge, the flow advances to step 58 to check whether the first detector 311 detects the inside cartridge. If YES in step 58, the flow advances to step 59, and the inside cartridge in-use display is performed at the display portion 120. The desired frame in the film in the inside cartridge is retrieved in step 60. If the desired frame is retrieved and is observed on the screen or the like, the film is returned to the inside cartridge. In step 61, if the inside cartridge is exhausted by the CHL 51 from the first cartridge reception member 11, the flow advances to step 53. The cotnroller 100 then checks in step 53 which one of the detectors 311 and 312 detects the cartridge first. The film in the cartridge which is first detected by the first or second detectors 311 and 312 is retrieved. If the other cartridge is mounted on the cartridge reception member in advance while one cartridge is being used, the cartridge mounted in advance can be used as soon as the used cartridge is exhausted. The retrieval operations of the inside and outside cartridges have been described with reference to FIGS. 6 to 9, and a detailed description will be omitted.

According to the embodiment shown in FIG. 10, the mounted cartridges can be sequentially utilized to shorten the retrieval time and the system can be efficiently used.

In the above embodiment, the cartridge is manually attached to or detected from the second cartridge reception member 13. However, the cartridge may be automatically attached to or detached from the second cartridge reception member. In this case, the cartridge may be fed from the cartridge storage portion to the second cartridge reception member by means of the cartridge carrier mechanism, as previously described.

Figure 11:
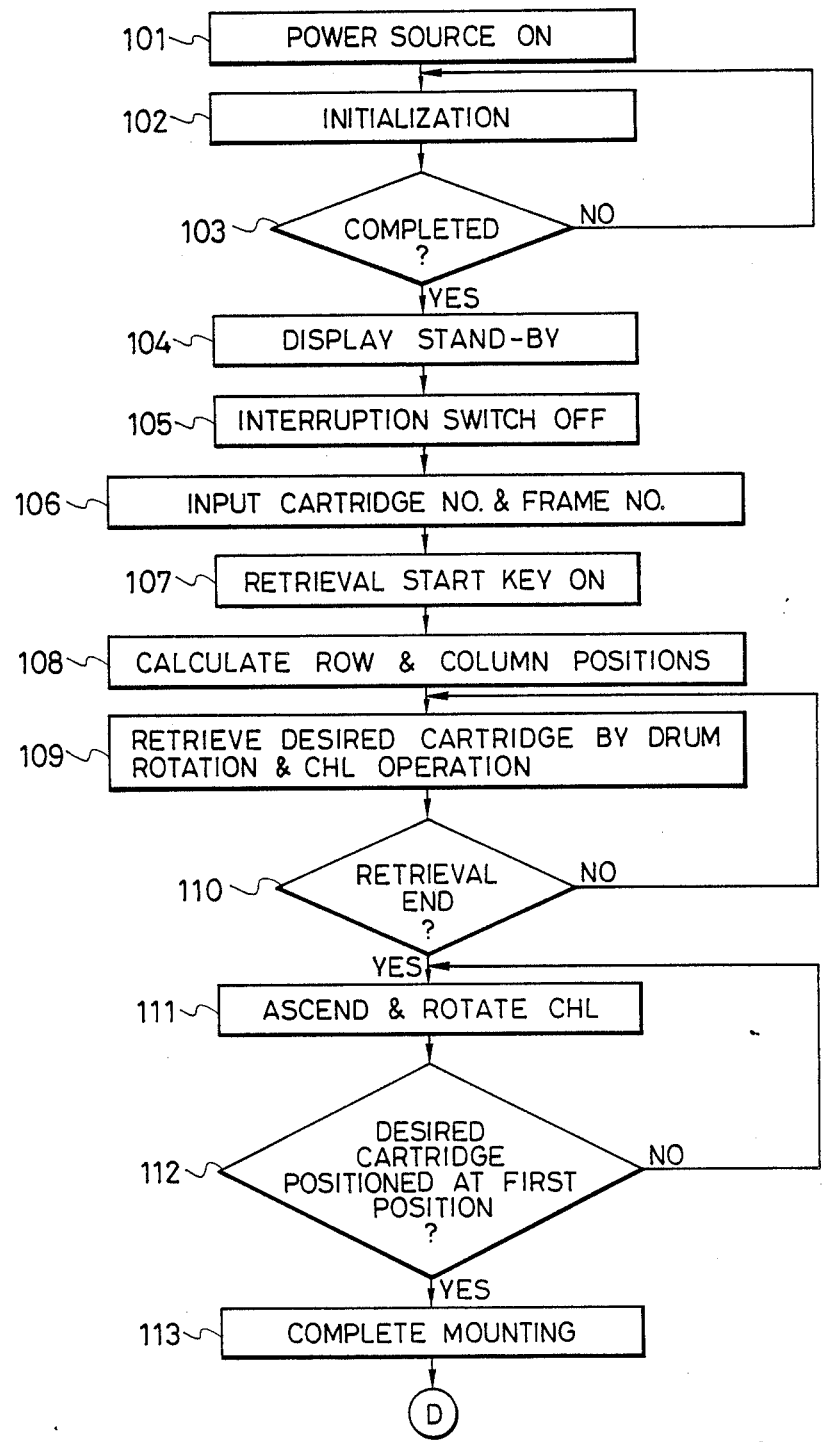
FIGS. 11 to 13 are flow charts for explaining the interruption operation.
Figure 12:
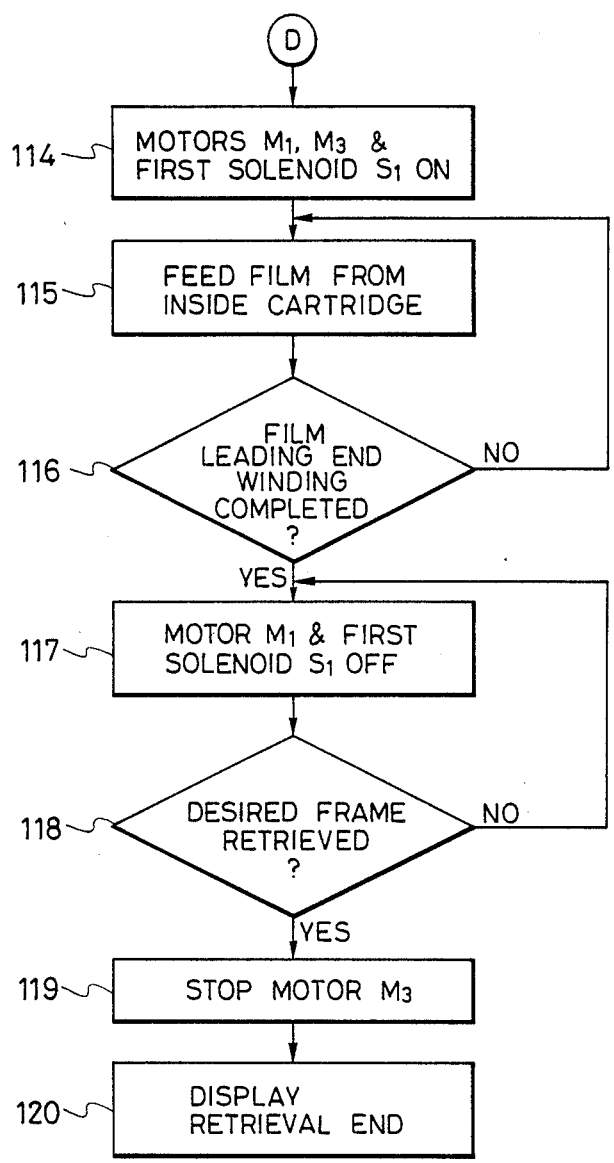
Figure 13:
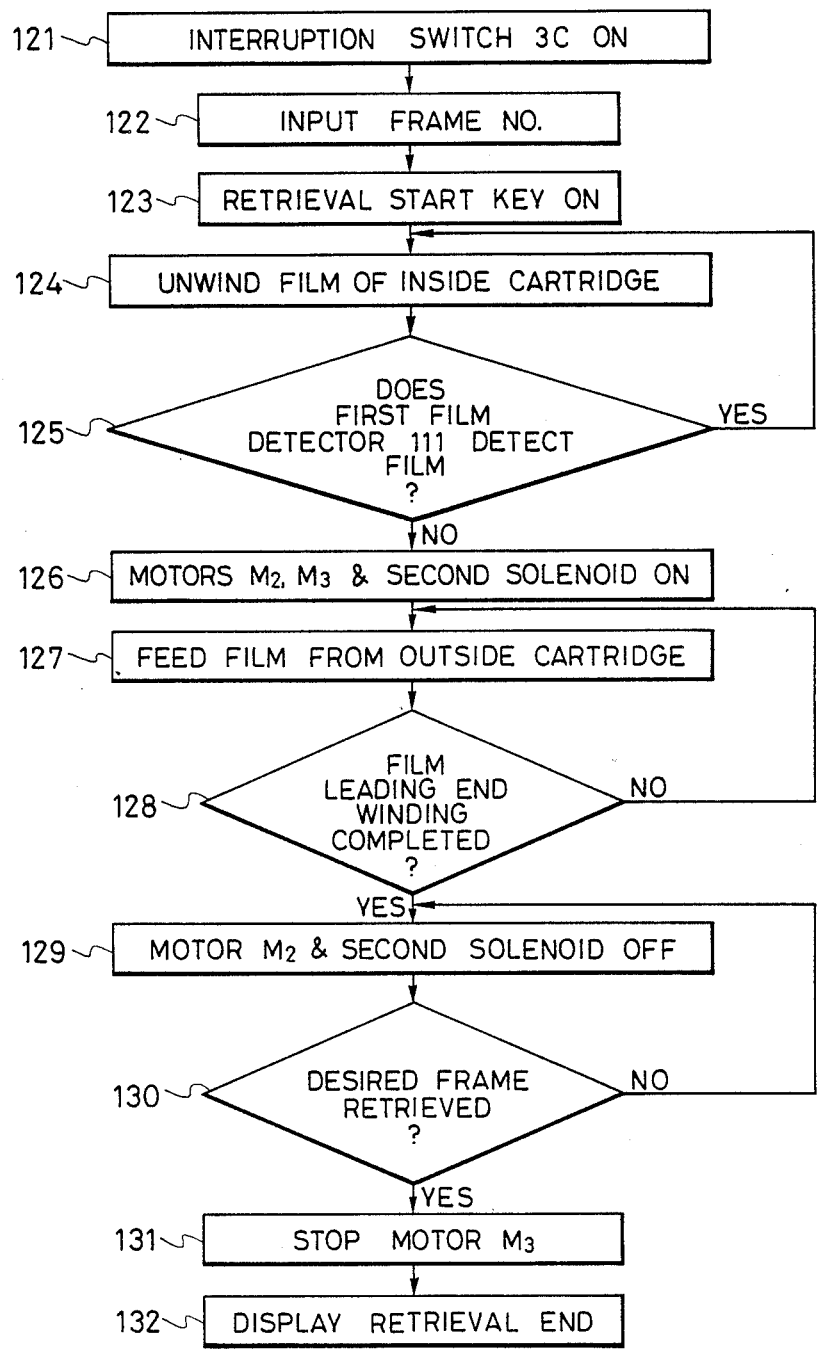

FIGS. 11 to 13 are flow charts for explaining the interruption. If the power switch is turned on in step 101, the drums 50A to 50F are rotated to locate the predetermined angular positions as the home positions, and the CHL 51 is driven and set in a predetermined home position (initialization) in step 102. The system is set in the stand-by mode (step 104).

The flow advances to step 105, and an interruption switch 3C is turned off. The operator then enters a desired cartridge number and a desired frame number with the ten-key pad on the input device 3B in step 106. The retrieval start switch is then turned on in step 107.

The controller 100 calculates the row and column positions of the desired cartridge according to the input cartridge number in step 108. The drums 50A and 50B are rotated and the CHL 51 is driven to retrieve the desired cartridge according to the calculated row and column numbers in step 109. If the desired cartridge 10 is retrieved (step 110) and is held by the hand 58, the lifting member 56 is moved upward and the movable member 57 is pivoted (step 111). If the desired cartridge reaches the first position in step 112, the retrieved cartridge 10 is mounted in the first cartridge reception member 11, and cartridge mounting is thus completed (step 113). The flow advances to step 114 in FIG. 12. In this step, the motors M1 and M3, and the first solenoid S1 are turned on so that the pickup roller 35 is brought into rolling contact with the film in the cartridge 10, thereby feeding the film (step 115).

If the leading end of the film is wound around the take-up reel 18 (step 116), the motor M1 and the first solenoid S1 are turned off, but the motor M3 continues to rotate to cause the take-up reel 18 to wind the film. If the desired frame is retrieved in step 118, the motor M3 and therefore the film are stopped in step 119, thereby completing the retrieval (step 120). In this state, the desired frame is projected onto the screen so that the user can observe the image of the desired frame. After the frame is used, the user turns on the rewind key in the input device 3B. A rewind motor (not shown) coupled to the film spool in the inside cartridge 10 is driven to rewind the film into the cartridge 10.

After rewinding is completed, the CHL 51 is operated in an order opposite to that described above. The used cartridge is returned to the corresponding drum. If an outside cartridge is used by interruption while the inside cartridge is being used, the interruption is performed according to the flow chart in FIG. 13.

If the user wishes to urgently use an outside cartridge 12 while the inside cartridge 10 is being used, the outside cartridge 12 is mounted in the second cartridge reception member 13 and turns on the interrupt switch 3C in step 121. In step 122, the user enters a desired frame number of the film of the outside cartridge with the ten-key pad in the input device 3B. The user then turns on the retrieval start key in step 123, and the flow advances to step 124. The rewind motor coupled to the film spool in the inside cartridge 10 located in the first position is turned on. The film is rewound into the inside cartridge 10, and thus use of the inside cartridge is interrupted. If the first film detector 211 does not detect the film in step 125, i.e., if the film is completely rewound into the inside cartridge 10, film rewinding is completed and the flow advances to step 126. In step 126, the motors M2 and M3, and the second solenoid S2 are turned on so that the pickup roller 36 is brought into rolling contact with the film in the cartridge 12, thereby feeding the film (step 127). When the film is wound around the take-up reel 18 (step 128), the motor M2 and the second solenoid S2 are turned off (step 129). The motor M3 continues to rotate to cause the film take-up reel 18 to wind the film. If the desired frame is retrieved in step 130, the motor M3 and therefore the film are stopped in step 131, and the retrieval is completed (step 132). In this state, the desired frame is projected onto the screen, and the user can observe the image of the desired frame.

As is apparent from the above description, the user turns on the interruption switch to set the mode in the interruption mode while the inside cartridge is being used. The film of the inside cartridge is returned thereinto, and instead the film of the outside cartridge is fed to the projection portion. In this manner, the second cartridge can be used even while the first cartridge is being used. When the user turns on the rewind key in the input device 3B after the film of the outside cartridge is used, a rewind motor coupled to the film spool in the outside cartridge 12 is driven to rewind the film into the cartridge 12.

When the second film detector 212 does not detect the film, i.e., when the film is completely rewound into the outside cartridge, rewinding is completed. The flow returns to step 114 in FIG. 11 again, the motors M1 and M3, and the first solenoid S1 are turned on to feed the film from the inside cartridge 10 again. The operations in steps 115 to 120 are performed to project the image of the desired frame of the film in the inside cartridge. The user can observe the image of the desired frame, and thus the interruption operation is cancelled.

In the above embodiment, if the inside cartridge 10 is not mounted in the first cartridge reception member 11, i.e., if the inside cartridge is not used, the outside cartridge is simply mounted in the second cartridge reception member and the interrupt switch 3C is turned on. In this case, steps 124 and 125 in FIG. 13 are omitted. The operations in steps 121 to 123 and steps 126 to 132 are performed to retrieve the desired frame of the film in the outside cartridge to the projection portion.

In the above embodiment, there is only one holding position of the outside cartridge. However, a plurality of outside cartridges may be held at the corresponding positions and may be selectively fed to the common path.

The number of cartridge mounting positions is not limited to two. The cartridge may be mounted at any one of three or more different positions. The films of the cartridges mounted at different positions are selectively fed to the common projection portion.

In each embodiment described above, the cartridge stores an information recording medium as a film roll. However, a cartridge which accommodates a plurality of microfiches, a cartridge which accommodates a magnetic tape in which information is magnetically recorded, or a cartridge which accommodates an optical disk in which a binary signal is optically recorded may be used in place of the cartridge which accommodates a film roll. If magnetic tape is used as an information recording medium, information is read by a known magnetic reproducing apparatus.

A case for accommodating a film or the like may be a casing (e.g., a cassette) or a frame assembly.

In the above embodiment, the second cartridge can be used in response to the interruption instruction while the first cartridge is being used. The user need not wait until the first cartridge is returned to the original location, unlike in the conventional system. As a result, the retrieval time can be shortened and practical advantages are provided.

Figure 14:
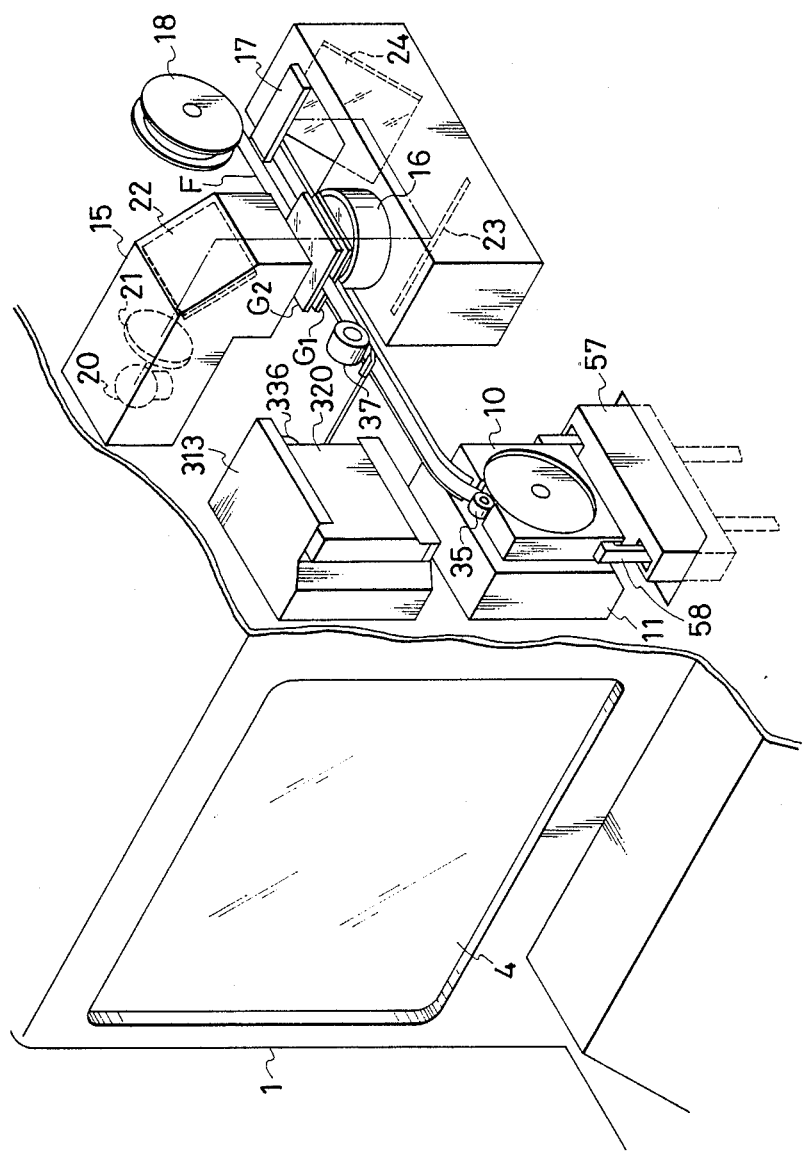
FIG. 14 is a perspective view showing the main part of a reader/printer according to another embodiment of the present invention.
Figure 15:
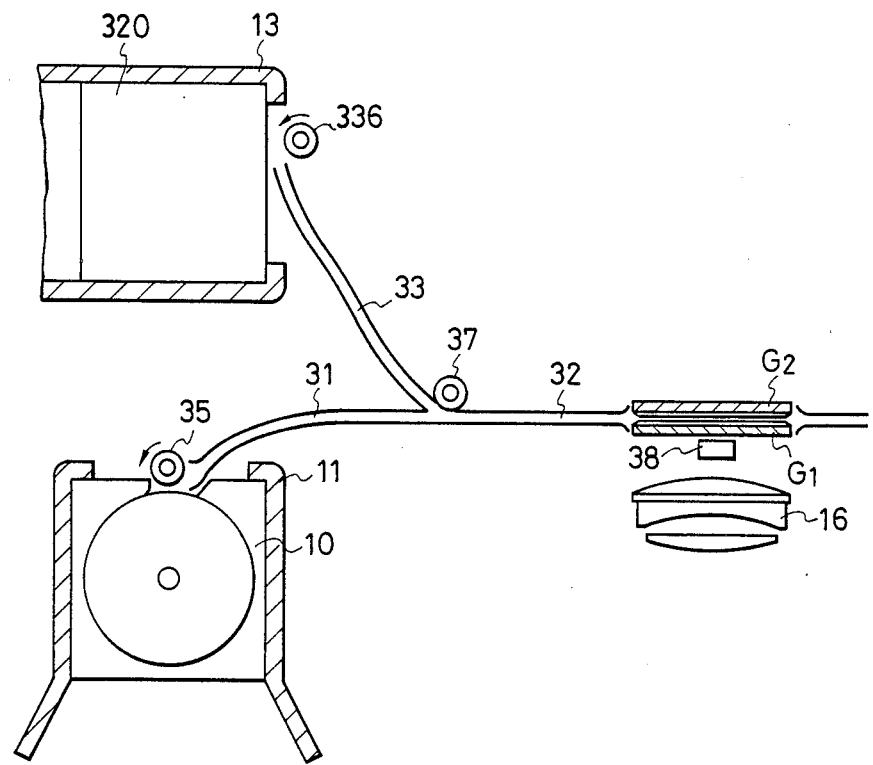
FIG. 15 is a side view of a film feed path in the reader/printer in FIG. 14.

FIGS. 14 and 15 show an embodiment wherein films in the cartridges having different forms are selectively used.

The first cartridge 10 is the same as that used in the previous embodiments. However, a second cartridge 320 has a shape different from that of the first cartridge 10.

FIGS. 16(A) and 16(B) show outer appearances of cartridges, respectively. The first cartridge 10 has a substantially U-shaped frame 10A and a reel 10B on which a microfilm F is wound, as shown in FIG. 16(A). The reel 10B is rotatably supported by a circular holder 10C formed on the frame 10A. In order to pull the microfilm from the first cartridge, a film pickup roller (to be described later) is brought into contact with the microfilm F wound around the reel 10B and is rotated in the film feed direction. The microfilm is continuously pulled from the first cartridge 10 through a film inlet/outlet port 10D according to the rotational force of the pickup roller. If the spool of the reel 10B is rotated in a direction of an arrow, the microfilm F is rewound on the reel 10B. The first cartridge 10 is called an E type cartridge.

The second cartridge 320 has a rectangular casing 320A which accommodates the film, as shown in FIG. 16(B). A film inlet/outlet port 320B is formed on the side surface of the casing 320A. The microfilm in the second cartridge 320 is wound around a reel (not shown) The leading end of the microfilm is connected to a leader tape R having a width larger than that of the microfilm and the flange. In order to pull the microfilm from the second cartridge 320, a film pickup roller (to be described later) is brought into contact with the leader tape R wound at the outer edge of the reel in the cartridge and is rotated in the film feed direction. The leader tape and the microfilm in the second cartridge 320 are sequentially pulled by the rotational force of the pickup roller through the film inlet/outlet port 320B. In order to rewind the film into the reel, the spool of the reel is rotated in the direction of the arrow (FIG. 16(A)). The second cartridge 320 is called an M type cartridge.

Referring to FIG. 14, an illumination portion 15 comprises a lamp 20, a condenser lens 21, and a mirror 22. Light from the lamp 20 is projected through the condenser lens 21 and the mirror 22 onto a microfilm F located between a pair of glass plates G1 and G2. Light transmitted through the microfilm passes through a focusing lens 16, reflected by mirrors 23 and 24, and projected onto the image sensor 17. The image sensor 17 comprises an array of light-receiving elements such as CCDs. The image sensor 17 converts an image of the microfilm into an electrical signal. An image signal from the image sensor is processed by a signal processor, and the processed signal is sent to a known printer such as a laser beam printer. A copy image is thus produced at the printer. If the above system is used as a reader, light passing through the focusing lens 16 is projected onto the screen 4 through an optical system (not shown) so that the user can observe the image of the microfilm on the screen. A known electrophotographic photosensitive body may be located in place of the image sensor 17 to perform normal copying.

FIG. 15 shows microfilm feed paths. A microfilm in the first cartridge 10 is fed along a first path 31 and a second path 32, passes between the glass plates G1 and G2, and is guided to the take-up reel 18. A microfilm in the second cartridge 320 passes along a third path 33 and the second path 32, is fed between the glass plates G1 and G2, and is guided to the take-up reel 18. The first and third paths 31 and 33 merge into the second path 32. The microfilms of the cartridges 10 and 320 are fed to the common second path 32. Film guide plates are arranged along the paths 30 to 33. Each film is guided by the film guide plates along a predetermined path. The microfilm feed mechanism also include film pickup rollers 35 and 336, a film guide roller 37, and a mark detector 38.

The film pickup roller 35 is coupled to a motor M1 and can be moved by a rotary solenoid (not shown) between a position where the roller 35 is in rolling contact with the microfilm in the cartridge 10 located in the first position and a position where the roller 35 is separated from the microfilm. The film pickup roller 136 is coupled to a motor M2 and can be moved by a rotary solenoid (not shown) between a position where the roller 336 is in rolling contact with the microfilm in the cartridge 320 located in the second position and a position where the roller 336 is separated from the microfilm.

If the first cartridge 10 is used, the roller 35 is rotated counterclockwise in response to a retrieval instruction and is moved to the position where the roller 35 is in rolling contact with the microfilm F in the cartridge 10. The leading end of the microfilm is picked up outside the cartridge 10. The film F passes through the first and second paths 31 and 32 and is fed to the take-up reel 18. The take-up reel 18 is driven by a motor in the retrieval mode and automatically takes up the leading end of the film. When the leading end of the microfilm is wound around the take-up reel 18, the roller 35 is stopped. At the same time, the roller 35 is shifted to the position where it is separated from the microfilm. Thereafter, the film is pulled upon rotation of the take-up reel 18. However, when the microfilm is to be rewound, the film spool of a reel 10B of the cartridge 10 is rewound by a rewinding motor (not shown) in the rewinding direction.

However, if the second cartridge 320 is used, the roller 336 is rotated and brought into rolling contact with the microfilm in the cartridge 320. The leading end of the microfilm is picked up by the roller 336. The film passes along the third and second paths 33 and 32 and is guided to and wound by the take-up reel 18 in the same manner as described above. When the leading end of the microfilm is wound around the take-up reel 18, the roller 336 is stopped and at the same time is separated from the film. Thereafter, the film is pulled from the second cartridge upon rotation of the take-up reel. In order to rewind the film into the second cartridge 320, the film spool in the cartridge 320 is driven in the rewinding direction.

Two types of cartridges are used in the above embodiment. However, three or more cartridges may be used. In this case, the different types of cartridge are held at different positions and are selectively fed to a common path.

FIG. 17 shows a third cartridge different from the first and second cartridges described with reference to the above embodiment. A third cartridge 170 has a rectangular casing 170A which accommodates a microfilm. A film inlet/outlet port 170B is formed at the upper corner of the casing 170A. The microfilm in the third cartridge 170 is wound around a spool 170C. A projection 170D is formed at the leading end of the microfilm F. The projection 170D is engaged with the inlet/outlet port 170B and is not withdrawn into the casing 170A so that the leading end of the microfilm F is always located outside the casing 170A.

FIG. 18 shows a pickup mechanism for picking up the microfilm from the third cartridge 170. When the third cartridge 170 is mounted at a predetermined position, and a retrieval instruction is input, a capstan roller 172 is rotated in the film feed direction. A rotary solenoid (not shown) is energized so that a pinch roller 173 is pivoted about a shaft 174 toward the capstan roller 172. Pivotal movement of the pinch roller 173 causes clamping of the leading film end exposed outside the cartridge between the capstan roller 172 and the pinch roller 173. The microfilm F is continuously pulled outside the cartridge 170 by the rotational force of the pinch roller 173. The spool 170C is driven upon movement of the microfilm. The pulled microfilm is guided along a fourth path 175 constituted by the guide plates. The fourth path 175 is connected to the first path 31. The third cartridge is called a K type cartridge.

A mechanism for selecting the cartridge stored in the storage portion is not limited to the one exemplified by this embodiment, but may be extended to any known cartridge selection mechanism.

In the embodiment described above, different types of cartridges can be used in a single projection apparatus to provide an economical advantage and improve retrieval efficiency. In addition, desired information of the film in each cartridge can be retrieved within a short period of time. Furthermore, if a system includes a cartridge storage portion and a cartridge holding mechanism, the number of cartridges can be increased without increasing the capacity of the built-in cartridges.

What is claimed is:

1. A projection apparatus for selecting one of a plurality of cartridges each of which stores an information recording medium and for projecting information of the information recording medium stored in a selected one of said cartridges, comprising:
    first holding means for holding the cartridge in a first position;
    second holding means for holding another cartridge in a second position;
    optical means for projecting information of an information recording medium onto a predetermined position;
    detecting means for detecting the presence of the cartridges in said first and second holding means;
    first moving means for moving the information recording medium of the cartridge held by said first holding means to a projection position of said optical means;
    second moving means for moving the information recording medium of the cartridge held by said second holding means to the projection position;
    determination means for determining the order in which said cartridges were held in said first and second holding means in accordance with an output from said detecting means; and
    control means for controlling said first moving means and said second moving means in accordance with the determination of said determination means to move to said projection position the information recording medium in the mounted cartridges.

2. An apparatus according to claim 1, further comprising storage means for storing a plurality of cartridges, and feeding means for feeding the cartridge selected from said storage means to at least one of the first and second positions.

3. An apparatus according to claim 1, wherein said first and second holding means detachably hold the cartridges, respectively.

4. An apparatus according to claim 3, wherein said first holding means holds the cartridge stored in said projection apparatus, and said second holding means holds the cartridge externally inserted into said projection apparatus.

5. An apparatus according to claim 1, wherein a screen is located at the predetermined position.

6. An apparatus according to claim 1, wherein an image sensor is located at the predetermined position.

7. An apparatus according to claim 1, wherein a photosensitive body is located at the predetermined position.

8. A projection apparatus for selecting one of a plurality of cartridges each of which stores an information recording medium and for projecting information of the information recording medium stored in a selected one of said cartridges, comprising:
    first holding means for holding the cartridge in a first position;
    second holding means for holding the cartridge in a second position;
    optical means for projecting information of the information recording medium onto a predetermined position;
    mode change-over means for changing over a mode between a first mode using the cartridge held by said first holding means and a second mode using the cartridge held by said second holding means;
    detecting means for detecting a disabled state of the cartridge held by said first or second holding means; and control means for controlling a change-over operation of said mode change-over means in response to an output from said detecting means.

9. An apparatus according to claim 8, further comprising storage means for storing a plurality of cartridges, and feeding means for feeding the cartridge selected from said storage means to at least one of the first and second positons.

10. An apparatus according to claim 8, wherein said first and second holding means detachably hold the cartridges, respectively.

11. An apparatus according to claim 10, wherein said first holding means holds the cartridge stored in said projection apparatus, and said second holding means holds the cartridge externally inserted into said projection apparatus.

12. An apparatus according to claim 8, further comprising first moving means for moving the information recording medium of the cartridge held by said first holding means to a projection position of said optical means, and second moving means for moving the information recording medium of the cartridge held by said second holding means to the projection position.

13. An apparatus according to claim 12, wherein said detecting means detects a failure of said first moving means.

14. An apparatus according to claim 12, wherein said detecting means detects a moving abnormality of the information recording medium.

15. An apparatus according to claim 19, wherein said detecting means detects a failure of said feeding means.

16. An apparatus according to claim 9, wherein said detecting means detects a cartridge feeding abnormality.

17. An apparatus according to claim 11, wherein the second mode is set when said detecting means detects the disabled state of the cartridge held by said first or second holding means.

18. An information processing apparatus according to claim 13, wherein said plurality of cartridges comprises at least a first and second cartridge for holding a reel having a pair of flanges spaced from each other by a distance greater than a width of the information recording medium, and said second cartridge further has a leading end of the information recording medium connected to a leader tape having a width greater than the space between said pair of flanges, and wherein said first holding means holds said first cartridge and said second holding means holds said second cartridge.

19. An apparatus according to claim 18 wherein said formation medium is a microfilm.

20. An information reading apparatus for reading information of an information recording medium stored in a casing, comprising:
holding means for detachably holding at least two casings at different positions;
reading means for reading information of the information recording medium stored in the casing held by said holding means;
mode change-over means for changing over a mode between a first mode using the casing mounted at a first position of said holding means and a second mode using the casing mounted at a second position of said holding means;
detecting means for detecting a disabled state of the casing to be used; and
control means for controlling said mode change-over means in response to an output from said detecting means.

21. An apparatus according to claim 20, further comprising storage means for storing a plurality of cartridges, and feeding means for feeding the cartridge selected from said storage means to the first or second position.

22. An apparatus according to claim 20, wherein the casing is a microfilm cartridge.

23. An apparatus according to claim 20, wherein said reading means comprises a photoelectric transducer element for converting information of the information recording medium into an electrical signal.

24. An information processing apparatus for processing information on an information medium stored in a receptacle, comprising:
holding means for removably holding a receptacle at each of first and second positions;
processing means for processing the information on said information medium;
first moving means for moving said information medium in a receptacle held at said first position to said processing means;
second moving means for moving said information medium in a receptacle held at said second position to said processing means;
detecting means for detecting whether a receptacle is held at each of the first position and the second position;
determination means for determining the order in which said receptacle was held at said first and second positions; and
control means for controlling said first and second moving means to move said information medium in the receptacle mounted in accordance with said order determined by said determination means to said processing means.

25. An apparatus according to claim 24, wherein said processing means comprises optical means for projecting the information on said information medium.

26. An apparatus according to claim 25, wherein said information medium is a microfilm.

27. An apparatus according to claim 24, wherein said processing means comprises a photoelectric transducer element.

28. An information processing apparatus for processing information on an information medium stored in a receptacle, comprising:
storage means for storing a plurality of receptacles;
first holding means for removably holding a receptacle conveyed from said storage means at a first position;
second holding means for removably holding a receptacle conveyed from outside of said apparatus at a second position;
receptacle conveying means for conveying the receptacle from said storage means to said first holding means and returning the receptacle from said first holding means to said storage means;
processing means for processing the information on the information medium;
first moving means for moving the information medium in the receptacle held at said first position and returning said information medium from said processing means to said receptacle;
second moving means for moving the information medium in the receptacle held at said second position and returning said information medium to said receptacle;

instructing means for instructing interruption of the use of the information medium processed by said processing means; and control means for controlling said first and second moving means such that the information medium processed by said processing means is returned to its receptacle on the basis of the instruction from said instruction means and the processing means moves the information medium in another receptacle mounted at a different position from the receptacle to which the information medium processed by said processing means is returned.

29. An apparatus according to claim 28, wherein said processing means comprises optical means for projecting the information on the information medium.

30. An apparatus according to claim 29, wherein said information medium is a microfilm.

31. An apparatus according to claim 28, wherein said processing means comprises a photoelectric transducer element for reading the information on the information medium.

* * * * *